UNITED STATES PATENT OFFICE.

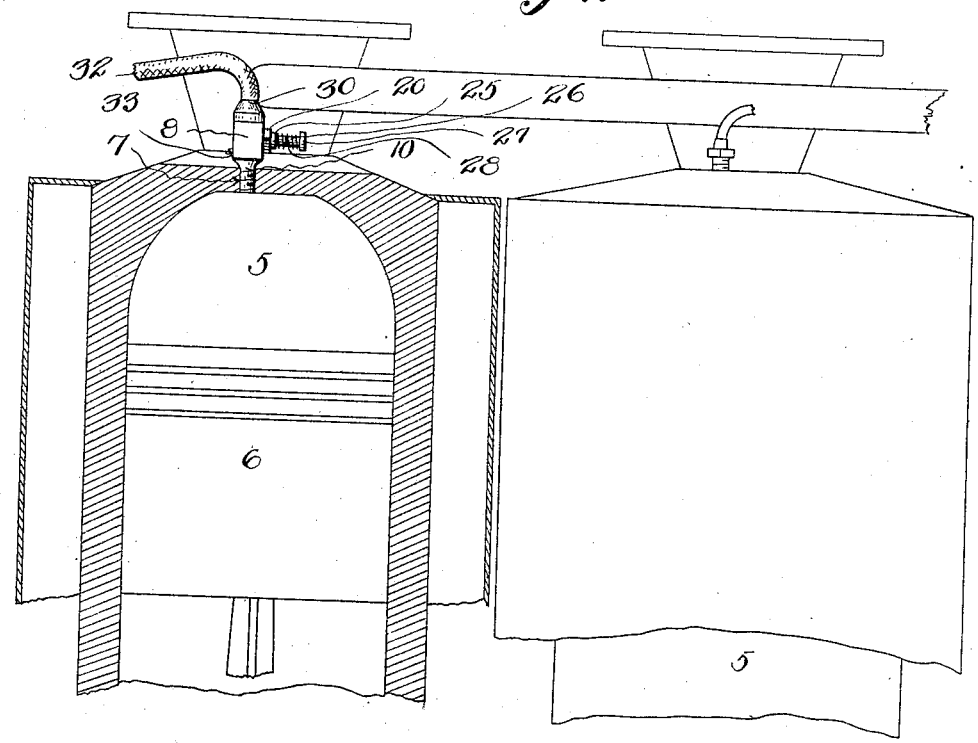
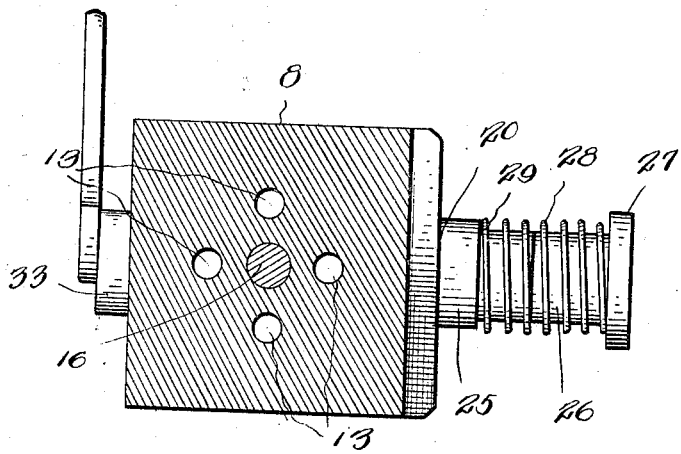

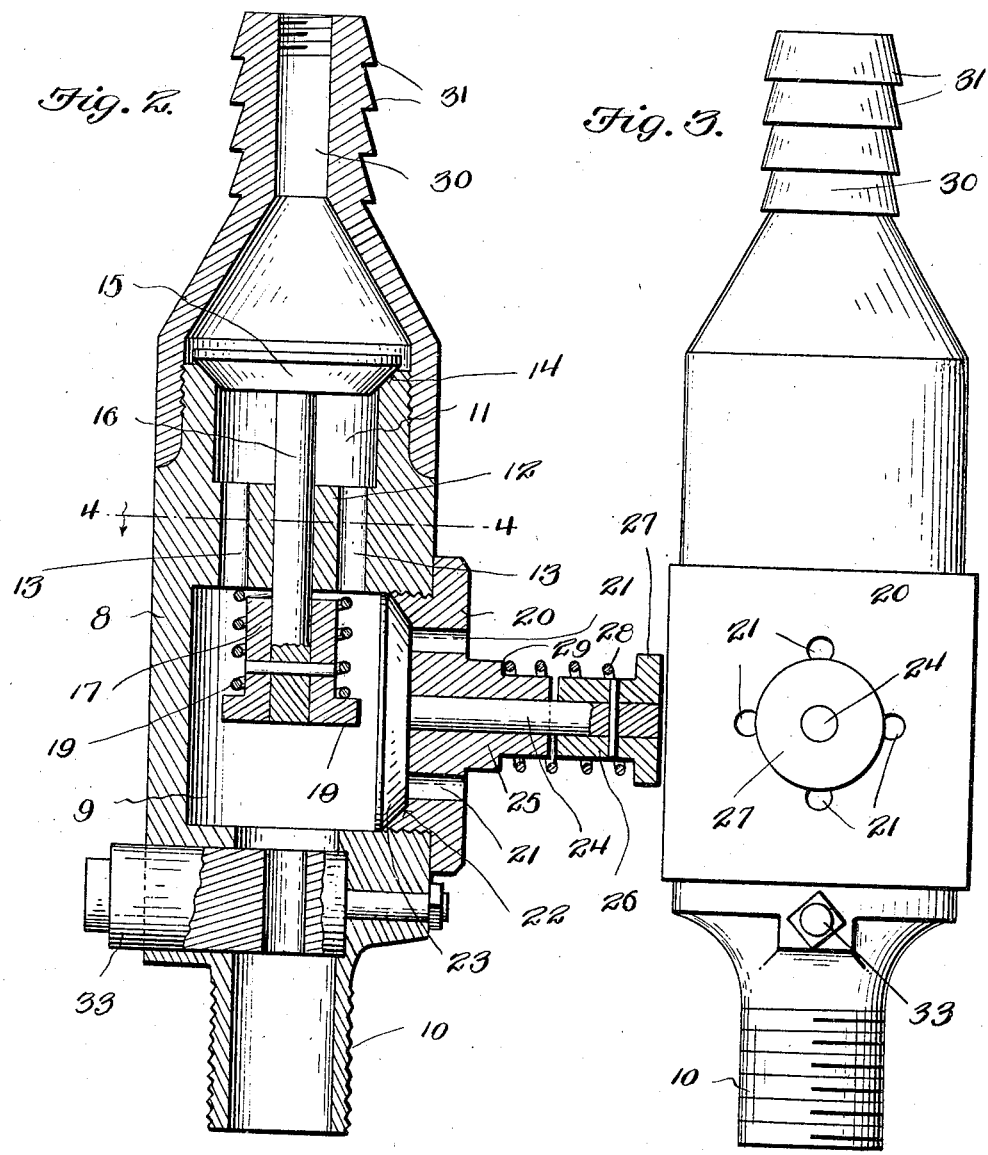

JOHN W. NEBLETT, OF RIVERSIDE, CALIFORNIA.

TIRE-PUMP.

991,010.    Specification of Letters Patent.    Patented May 2, 1911.

Application filed August 5, 1910. Serial No. 575,656.

*To all whom it may concern:*

Be it known that I, JOHN W. NEBLETT, a citizen of the United States, residing at Riverside, in the county of Riverside and State of California, have invented new and useful Improvements in Tire-Pumps, of which the following is a specification.

The invention relates to a tire pump, and more particularly to the class of tire pumping attachments for engines in automobiles.

The primary object of the invention is the provision of an attachment of the class described in which pure air may be drawn into one of the cylinders of a multiple type of engine used in automobiles, and subsequently delivered into any one of the tires of the latter, whereby it may be quickly inflated when the engine has been started.

Another object of the invention is the provision of a pumping attachment of this character in which air may be introduced into the tires of an automobile on the starting of its engine, and that may be readily and easily attached to and detached from any one of the cylinders of a multiple gasolene engine, so that pure air may be accumulated and delivered into the tire for its inflation.

A further object of the invention is the provision of an attachment of this character which may be mounted for direct communication with any one of the cylinders of a multiple type gasolene engine used with an automobile, whereby pure air from the atmosphere will be forced into a tire on the wheel of the automobile for the inflation thereof in a rapid and convenient manner.

With these and other objects in view, the invention consists in the construction, combination and arrangement of parts, as will be hereinafter more fully described, illustrated in the accompanying drawings and pointed out in the claims hereunto appended.

In the drawings: Figure 1 is a vertical longitudinal sectional view of one cylinder of an engine with the device applied in position thereon. Fig. 2 is an enlarged vertical longitudinal sectional view through the device, the same being detached from the cylinder of the engine. Fig. 3 is a side elevation thereof. Fig. 4 is a sectional view on the line 4—4 of Fig. 2.

Similar reference characters indicate corresponding parts throughout the several views of the drawings.

Referring to the drawings by numerals, 5 designates generally the cylinder of a multiple type gasolene engine, ordinarily used in automobiles, in which works a piston 6, the cylinder being provided in its head with the usual spark plug opening 7 in which is detachably mounted the ordinary well-known spark plug, not shown. In this spark plug opening 7 or in any other suitable opening in the cylinder of the engine is adapted to be attached the tire pump, as will be hereinafter more fully described.

The tire pump comprises a casing 8 containing an air chamber or cavity 9, the same being intersected by air passages opening through opposite ends of the said casing. One end of this casing is reduced to provide an externally threaded nipple 10 which may be of any desirable size, the threads thereon being adapted to engage the threads in the spark plug or other opening 7 when the nipple 10 is screwed thereinto for the mounting of the casing upon the cylinder 5 of the engine, so that direct communication will be had between the said casing and cylinder for a purpose, as will be hereinafter more fully described. This casing 8 at its end opposite the nipple 10 is provided with a chamber 11, the latter being separated from the chamber 9 by means of a web 12, the same being formed with a plurality of spaced outlet ports 13 which establish communication between the said chambers. The wall of the chamber 11 at the outer end thereof is provided with a beveled valve seat 14 engaged by a disk valve 15, the same being formed with a central stem 16 slidably mounted through the web 12, and detachably connected with the inner end of this stem is a sleeve 17, the same being formed with an annular shoulder 18, against which bears one end of a retractile spring 19 surrounding the said sleeve 17 and its opposite end bearing against the inner face of the web 12, the spring seat being adapted to normally seat the disk valve 15 in its seat 14, so as to close the chamber 11 at one end of the casing.

In the side wall of the casing 8 is provided an internally threaded opening communicating with the chamber 9, and in this opening is detachably mounted a cap 20, the latter containing a series of spaced inlet ports 21, through which is admitted pure air from the atmosphere into the chamber 9 in the casing. This cap 20 is provided with an inner beveled valve seat 22, with which is engaged an inlet disk valve 23, the same being provided with a central stem 24 slidably mounted in the cap 20 and a boss 25 extending outwardly from the said cap, and upon the outer end of this stem 24 is detachably mounted a sleeve 26, the latter provided with an annular shoulder 27, with which one end of a coiled retractile spring 28 engages, the spring surrounding the boss and sleeve, and its inner end bearing against a further shoulder 29 formed exteriorly on the boss 25, the spring serving to maintain the valve 23 seated in the seat 22 in the cap for closing the inlet ports therein.

The chambered end of the casing 8 is provided with external threads detachably engaged by a nozzle 30, the latter being provided with external annular ribs 31, and connected with this nozzle 30 is a flexible tube 32, the latter being adapted for connection at its opposite end with a pneumatic tire of an automobile, whereby said tire may be inflated when the multiple cylinder engine has been started. The nipple end 10 above the threads thereon, or at any other suitable point thereof, is provided with a cut-off valve 33 for controlling the device, whereby the same may be held inactive, should it be desired to mount it permanently upon the cylinder of an engine.

In operation, assuming that the said attachment is connected in the spark plug or other opening 7 of one cylinder 3 of the multiple cylinder engine, and that the latter has been started so that the cylinders other than that to which the pump is attached are working, pure air will be drawn into the chamber 9 through the inlet ports 21 on the unseating of the valve 23, thence into the cylinder 5 communicating with the casing 8 by the stroke of the piston 6 in one direction in said cylinder. Now, upon movement of the piston 6 in the opposite direction in the cylinder 5, the air thus accumulated within the said cylinder will be forced out through the casing 8 into the tube 32, whence it will be delivered into the tire of an automobile wheel, whereby the latter may be inflated. It will be obvious that the wall of the bore in the nozzle 30 is partially threaded, whereby a connection of the flexible tube may be screwed in said nozzle, should the connection of such tube be too small to permit it to be externally connected to said nozzle.

What is claimed is:

1. In a device of the class described, a hollow casing having opposite contracted open ends and an intermediate opening in its side wall, a nipple detachably threaded on one contracted end of the casing, a perforated partition in the casing separating the same into independent compartments, a perforated cap threaded in the opening in the side wall of the casing and having an internal valve seat, a valve normally engaging said seat and closing the perforation in the cap, a spring acting upon said valve to hold the same in its normally seated position, a valve seat formed at the end of the casing carrying said nipple, a valve normally engaging said last-named seat, a spring acting upon the last-named valve to sustain the same in its seated position, and a turning plug valve mounted in the casing and adapted for opening and closing the other contracted end of the said casing.

2. In a device of the class described, a hollow casing having opposite contracted open ends and an intermediate opening in its side wall, a nipple detachably threaded on one contracted end of the casing, a perforated partition in the casing separating the same into independent compartments, a perforated cap threaded in the opening in the side wall of the casing and having an internal valve seat, a valve normally engaging said seat and closing the perforation in the cap, a spring acting upon said valve to hold the same in its normally seated position, a valve seat formed at the end of the casing carrying said nipple, a valve normally engaging said last-named seat, a spring acting upon the last-named valve to sustain the same in its seated position, and a turning plug valve mounted in the casing and adapted for opening and closing the other contracted end of the said casing, the said nipple and the opposite contracted end of the casing being adapted for connection with a tire and engine cylinder, respectively, substantially as described.

In testimony whereof I affix my signature in presence of two witnesses.

JOHN W. NEBLETT.

Witnesses:
G. F. BENTLEY,
W. T. DINSMORE.